United States Patent
Bunel et al.

(10) Patent No.: US 9,757,891 B2
(45) Date of Patent: Sep. 12, 2017

(54) MOLD FOR BLOW MOLDING A HOT-FILL CONTAINER WITH INCREASED STRETCH RATIOS

(71) Applicant: SIDEL PARTICIPATIONS, Octeville sur Mer (FR)

(72) Inventors: Christophe Bunel, Octeville sur Mer (FR); Florian Godet, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 301 days.

(21) Appl. No.: 14/762,900

(22) PCT Filed: Jan. 22, 2014

(86) PCT No.: PCT/EP2014/051202
§ 371 (c)(1),
(2) Date: Jul. 23, 2015

(87) PCT Pub. No.: WO2014/122018
PCT Pub. Date: Aug. 14, 2014

(65) Prior Publication Data
US 2015/0352773 A1    Dec. 10, 2015

(30) Foreign Application Priority Data
Feb. 6, 2013   (EP) .................................... 13305143

(51) Int. Cl.
*B29C 49/48*   (2006.01)
*B29C 49/54*   (2006.01)
(Continued)

(52) U.S. Cl.
CPC .............. *B29C 49/28* (2013.01); *B29B 11/14* (2013.01); *B29C 49/541* (2013.01);
(Continued)

(58) Field of Classification Search
CPC .......... B29C 49/541; B29C 2049/4882; B29C 2049/4892
See application file for complete search history.

(56) References Cited

U.S. PATENT DOCUMENTS 4,035,455 A    7/1977   Rosenkranz et al.
4,769,206 A *  9/1988   Reymann .............. B29C 49/541
                                                       264/534
(Continued)

FOREIGN PATENT DOCUMENTS

EP    0 572 722 A1    12/1993
FR    2 919 579 A1    2/2009
(Continued)

OTHER PUBLICATIONS

International Search Report, dated May 9, 2014, from corresponding PCT application.

*Primary Examiner* — Robert B Davis
(74) *Attorney, Agent, or Firm* — Young & Thompson

(57) ABSTRACT

A mold for blow molding a container from a preform, the container including a wall portion and a base including a high standing ring and a central outwardly-inclined invertible diaphragm, the mold including sidewalls forming a counter print of the wall portion of the container (1) and a mold base (36) having an upper surface (37) defining a counter print of the container base, wherein the upper surface (37) includes: an annular peripheral face (43) corresponding to an annular support flange of the container base; a frusto-conical outer face (44) corresponding to an inner portion (11) of the high standing ring, the outer face (44) protruding upwardly with a draft angle (A2) from an inner edge of the peripheral annular face (43) up to a sharp apex (45), and a frusto-conical downwardly inclined inner face (46) corresponding to the invertible diaphragm.

12 Claims, 7 Drawing Sheets

(51) Int. Cl.
*B29C 49/28* (2006.01)
*B29B 11/14* (2006.01)
*B65D 79/00* (2006.01)
*B65D 1/02* (2006.01)
*B29L 31/00* (2006.01)
*B29B 11/08* (2006.01)
*B29B 11/12* (2006.01)
*B29K 67/00* (2006.01)
*B29C 49/12* (2006.01)
*B29C 49/42* (2006.01)

(52) U.S. Cl.
CPC ......... B65D 1/0276 (2013.01); B65D 79/005 (2013.01); *B29B 11/08* (2013.01); *B29B 11/12* (2013.01); *B29B 2911/1444* (2013.01); *B29B 2911/1464* (2013.01); *B29B 2911/1476* (2013.01); *B29B 2911/14326* (2013.01); *B29B 2911/14331* (2015.05); *B29B 2911/14332* (2015.05); *B29B 2911/14333* (2013.01); *B29B 2911/14466* (2013.01); *B29B 2911/14486* (2013.01); *B29B 2911/14606* (2013.01); *B29B 2911/14633* (2013.01); *B29B 2911/14666* (2013.01); *B29B 2911/14693* (2013.01); *B29B 2911/14753* (2013.01); *B29B 2911/14886* (2013.01); *B29C 49/12* (2013.01); *B29C 49/4273* (2013.01); *B29C 2049/4838* (2013.01); *B29C 2049/4882* (2013.01); *B29C 2049/4892* (2013.01); *B29K 2067/003* (2013.01); *B29L 2031/7158* (2013.01)

(56) References Cited

U.S. PATENT DOCUMENTS

| | | | |
|---|---|---|---|
| 6,595,380 B2 * | 7/2003 | Silvers | B65D 1/0276 215/373 |
| 6,634,517 B2 * | 10/2003 | Cheng | B65D 1/0276 215/371 |
| 6,896,147 B2 | 5/2005 | Trude | |
| 7,451,886 B2 | 11/2008 | Lisch et al. | |
| 8,881,937 B2 * | 11/2014 | Derrien | B29C 49/48 220/675 |
| 2007/0215571 A1 | 9/2007 | Trude | |
| 2008/0047964 A1 | 2/2008 | Denner et al. | |
| 2009/0202766 A1 | 8/2009 | Beuerle et al. | |
| 2010/0163513 A1 | 7/2010 | Pedmo | |
| 2010/0219152 A1 | 9/2010 | Derrien et al. | |
| 2011/0204067 A1 | 8/2011 | Schneider et al. | |
| 2013/0087954 A1 | 4/2013 | Tsuchiya | |

FOREIGN PATENT DOCUMENTS

| | | |
|---|---|---|
| MX | 2012 009 509 A | 11/2012 |
| WO | 2004/028910 A1 | 4/2004 |
| WO | 2012/002164 A1 | 1/2012 |

* cited by examiner

MOLD FOR BLOW MOLDING A HOT-FILL CONTAINER WITH INCREASED STRETCH RATIOS

FIELD OF THE INVENTION

The invention generally relates to the manufacturing of containers, such as bottles, which are produced by blow molding or stretch-blow molding from preforms made of plastic (mostly thermoplastic, e.g. PET) material. More specifically, the invention relates to a mold for the manufacturing of containers, in particular hot-fill containers, which are ready to be filled by liquids at a high temperature (generally higher than the glass transition temperature of the material in which the container is made).

BACKGROUND OF THE INVENTION

It is known that the blow molding of a container generates both an axial (or length) stretch and a radial (or hoop) stretch which provides molecular bi-orientation—and hence a good structural rigidity—to the material of the container.

Although the structural rigidity of an ordinary container is generally sufficient in common applications (such as still water) to resist low mechanical constraints due to the hydrostatic pressure of the liquid therein, it is insufficient to withstand high mechanical constraints generated in the material during a hot-filling.

Indeed, residual stresses in the material are released during hot-filling (particularly with a liquid having a temperature higher than the glass transition temperature of the material), causing a deformation of the container that could make it unsuitable for use—and hence for sale.

To decrease deformation of the container during hot-filling, it is known to run the blow molding within a mold cavity usually provided with sidewalls heated at a predetermined temperature and with a mold base, and to complete the blowing through a thermal treatment called heat set, by which the container is held in contact with the sidewalls at a predetermined temperature between 80° C. and 180° C. for a predetermined time (generally several seconds).

Generally, two sidewalls are present. They are usually named "half-molds". They can be moved away the one from the other and from the mold base for allowing either the introduction of a preform or the removal of a finished container and placed in close contact together and with the mold base during the stretch blow molding step.

However, heat setting solves only part of the problems of deformation of a hot-fill container. Indeed, while cooling, the liquid and the air above the liquid in the capped container undergo a decrease in volume that tends to make the container retract.

Several solutions have been considered for decreasing the visible effects of such retraction. These solutions generally concern the shape of the container.

For example, it has been proposed to equip the body of the container with deformable side panels that bend inwards under the effect of the retraction and bend back outwards when the container is opened. Such containers must be handled with care by the user because of the flexibility of the body, which may result in accidental spraying.

It has also been proposed to provide the container with a base portion capable of withstanding the various stresses and strains applied to the container, see e.g. U.S. Pat. No. 6,896,147 (assigned to Graham).

More recently, it has been proposed to give the bottom of the container a special shape capable of absorbing at least part of the deformation due to retraction whereas the body of the container is provided with a rigid (i.e. resistant to hot-fill deformation) structure, see e.g. U.S. Pat. No. 7,451,886 (assigned to Amcor).

Deformable bottoms take advantage over deformable side panels in that from the user's point of view the container has a more attractive shape. However, the amount of vacuum absorbed by deformation of the deformable bottom may be insufficient and result in a deformation of the body which may take an oval shape (such a well-known deformation is called "ovalization" by the skilled technicians).

U.S. Pat. Appl. No. 2008/0047964 (Denner et al, assigned to CO2PAC) discloses a container comprising a pressure panel located in the bottom portion of the container. The pressure panel is movable between an outwardly-inclined position and an inwardly-inclined position to compensate for a change of pressure inside the container. In order to alleviate all or a portion of the vacuum forces within the container, the pressure panel is moved from the outwardly-inclined position by a mechanical pusher in order to force the pressure panel into the inwardly-inclined position. The inversion of the pressure panel from the outwardly-inclined position to the inwardly-inclined position reduces the internal volume of the container.

Denner also provides an exemplary method of blow molding such a plastic container, which includes enclosing a softened polymer material such as PET within a blow mold having side wall portions and a mold base portion movable with respect of the side mold portions in the vertical direction between a retracted position and an extended position. The mold base portion is displaced upwardly into the mold cavity to form a transverse pressure panel deeply set within the base portion of the container.

Although Denner provides a solution which in theory alleviates the drawbacks of previous solutions with deformable bottoms in that it maximizes the amount of vacuum compensation, Denner fails to disclose the details of the movable mold base portion, the use of which, as may be noted, is already known through U.S. Pat. No. 4,035,455 (Rosenkranz et al). More specifically, Denner fails to point out specific structural features of the mold base which would allow the target container to be correctly formed. In addition, blow molding trials showed that a container according to Denner is not suitably designed for blow molding or for a proper inversion of the pressure panel after filling and capping.

SUMMARY OF THE INVENTION

It is a main purpose of the present invention to alleviate the hereabove mentioned drawbacks of the prior art.

It is one object of the invention to propose a blow mold permitting the manufacturing of containers showing good hot-fill performances.

It is yet another object of the invention to propose a blow mold capable of facilitating the blow molding of containers provided with a high standing ring and an invertible diaphragm.

It is therefore proposed a mold for blow molding a container from a preform, said container comprising a wall portion and a base including a high standing ring and a central outwardly-inclined invertible diaphragm, said mold comprising sidewalls forming a counter print of the wall portion of the container and a mold base having an upper surface defining a counter print of the container base, wherein the upper surface includes:

an annular peripheral face corresponding to an annular support flange of the container base, a frusto-conical outer face corresponding to an inner portion of the high standing ring, said outer face protruding upwardly with a draft angle from an inner edge of the peripheral annular face up to a sharp apex, a frusto-conical downwardly inclined inner face corresponding to the invertible diaphragm.

According to various embodiments, taken either separately or in combination:

the annular peripheral face is in the shape of a frustum of a cone and shows an inward inclination in a transversal section;

the peripheral face defines, with respect of a plane perpendicular to a mold base axis, an angle comprised between 1° and 10°, preferably between 2° and 5°, and for example of about 3°;

the draft angle is comprised between 1° and 10°, preferably between 3° and 6°, and for example of about 4.5°;

the outer face and the inner face of the upper surface of the mold base together define at the apex an angle comprised between 50° and 70°, preferably between 60° and 65°, and for example of about 63°;

the apex has a radius of curvature of less than or equal to 1.5 mm, preferably less than or equal to 0.25 mm;

the inner face of the upper surface extends from the apex down to an annular inner edge where the inner face connects to a central uprising push-up corresponding to a central recess in the container base;

the inner edge of the inner face defines with a peripheral plane defined by an outer edge of the peripheral face a clearance comprised between 1 mm and 5 mm, and preferably of about 2 mm;

the mold base is movable with respect of the sidewall, between a retracted position in which the upper surface extends below the container base to be formed, and a raised position in which the upper surface closes the cavity;

The above and other objects and advantages of the invention will become apparent from the detailed description of preferred embodiments, considered in conjunction with the accompanying drawings.

DETAILED DESCRIPTION

Figure 1:
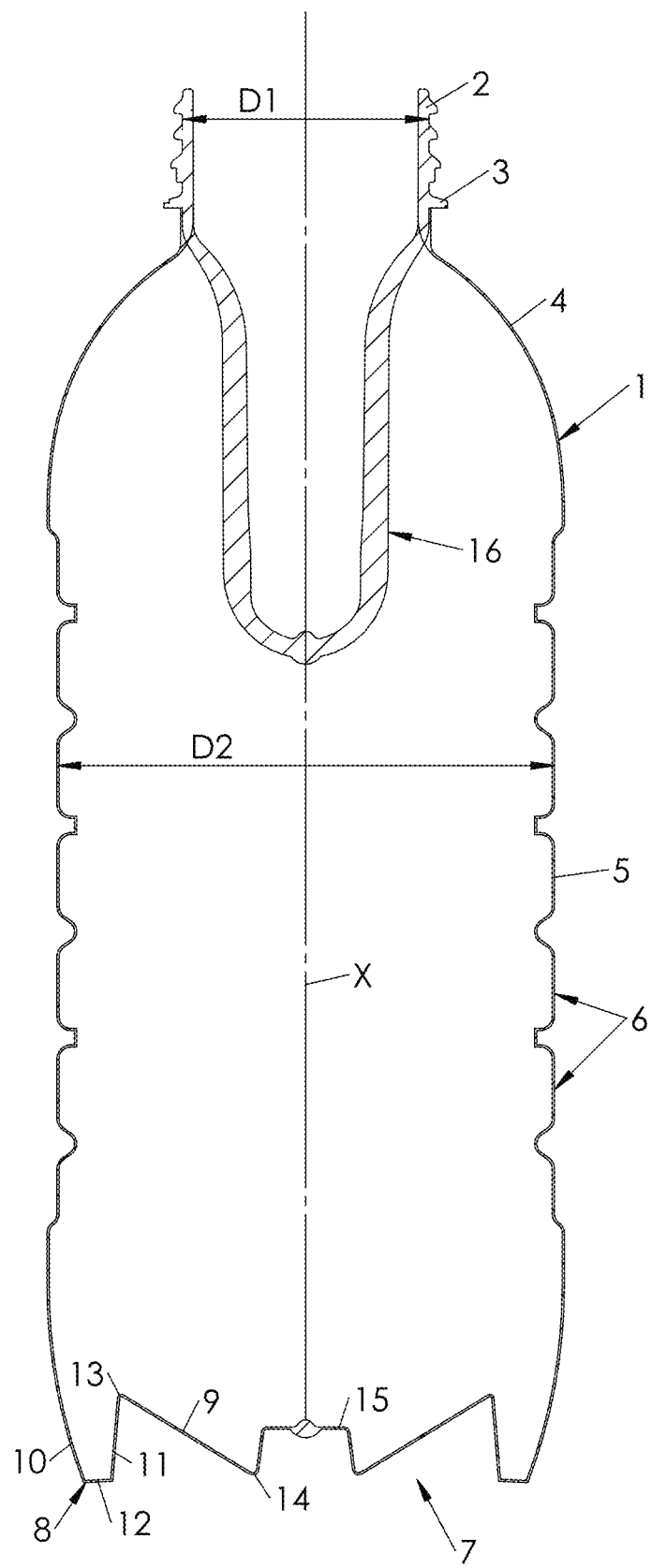
FIG. 1 is a realistic sectional view showing both a preform and a resulting hot-fill container formed therefrom.

FIG. 1 illustrates a hot-fill container 1 suitable for being filled with a hot product (such as tea, fruit juice, or a sports drink).

The container 1 includes an upper open cylindrical threaded upper portion or neck 2, which terminates, at a lower end thereof, in a support collar 3 of greater diameter. Below the collar 3, the container 1 includes a shoulder 4 which is connected to the collar 3 through a cylindrical upper end portion of short length.

Figure 2:
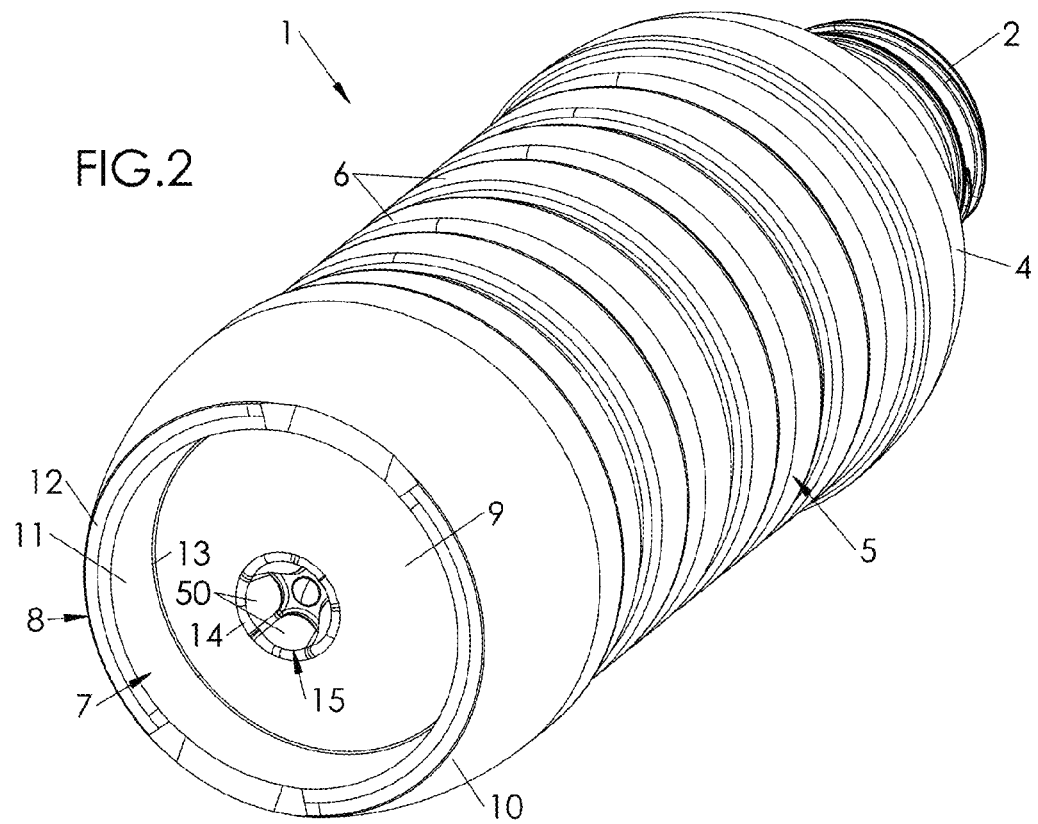
FIG. 2 is a realistic bottom perspective view showing the container of FIG. 1.

Below the shoulder 4, the container 1 has a wall portion 5 which is substantially cylindrical around a container main axis X. The wall portion 5 may, as depicted on FIGS. 1 and 2, include annular stiffening ribs 6 capable of resisting stresses which would otherwise tend to make the wall portion 5 oval when viewed in a horizontal section (such a deformation is standard and called ovalization).

The neck 2 has an outer diameter (taken between the threads) referenced D1 and the wall portion 5 has an overall diameter referenced D2.

At a lower end of the wall portion 5, the container 1 has a base 7 which closes the container 1 and allows the container 1 to be put on a planar surface such as a table.

The container base 7 includes a standing ring 8, which is a high standing ring as it will be explained later, and a central outwardly-inclined invertible diaphragm 9 which is capable of being forcedly (e.g. mechanically) pushed upwards (i.e. inwards with respect of the container 1) after the container 1 has been filled with a product, capped and cooled down, in order to compensate for the vacuum generated by the cooling of the product.

The standing ring 8 connects to the wall portion 5 of the container at a lower end portion 10 thereof, an inner portion 11 and a support flange 12. The inner portion 11 connects the support flange 12 to the diaphragm 9.

Figure 3:
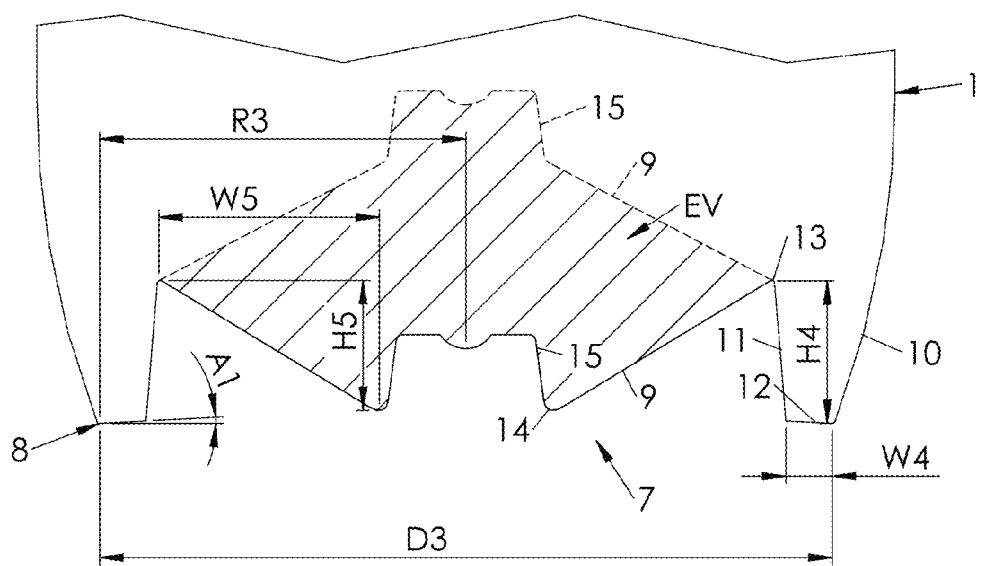
FIG. 3 is a realistic enlarged fragmentary sectional view showing a detail of the container of FIG. 1 through the base of the container.

In a preferred embodiment, the lower end portion 10 of the wall portion 5 has, when viewed in transversal section as shown on FIG. 3, the shape of an arch with a concavity turned inward with respect of the container 1, whereby the outer diameter, referenced D3, of the support flange 12 is smaller than the overall diameter D2 of the wall portion 5.

The inner portion 11 has the shape of a frustum of a cone and, when viewed in transversal section as shown on FIG. 3, inclines inwardly with respect of the container 1, with a draft angle.

The cone shape of the inner portion 11 provides a vault stiffening and locking function to the diaphragm 9 in its inverted position (in dotted line on FIG. 3), whereby the restriction of diameter of the inner portion 11 at its junction with the diaphragm 9 prevents the latter to articulate back from its inverted position with respect of the inner portion 11. As a result, re-inversion of the diaphragm 9 back to its initial position (in continuous line on FIG. 3) under the mere hydrostatic pressure of the content of the container is prevented.

The inner portion 11 has an axial extension which is important with respect of the outer diameter D3 of the support flange, hence the expression "high standing ring" to name the standing ring 8. More specifically, the axial extension (or height) of the inner portion 11, with reference H4, is greater than 1/10 of the outer diameter D3 of the support flange 12, and preferably comprised between 1/10 and 1/5 of the outer diameter D3 of the support flange 12:

$$\frac{D3}{10} \le H1 \le \frac{D3}{5}$$

In one preferred embodiment, which corresponds to the illustration of FIG. 3, the height H4 of the inner portion 11 is of about ⅙ of the outer diameter D3 of the support flange 12:

$$H4 \cong \frac{D3}{6}$$

The support flange 12 has a radial extension or width, noted W4, which is small with respect of the outer diameter D3 of the support flange 12. More specifically, the width W4 of the support flange 12 is comprised between 5% and 10%—and preferably of about 6%—of the outer diameter D3 of the support flange 12:

$$0.05 \cdot D3 \le W4 \le 0.1 \cdot D3$$

and, preferably:

$$W4 \cong 0.06 \cdot D3$$

The width W4 of the support flange 12 is also preferably in a ratio with the height H4 of the inner portion 11 comprised between ⅕ and ⅓, and preferably of about ¼:

$$\frac{H4}{5} \le W4 \le \frac{H4}{3}$$

and preferably:

$$W4 \cong \frac{H4}{4}$$

In addition, in the just-blown non-filled configuration of the container 1 as depicted on FIG. 1 and in continuous line on FIG. 3, the support flange 12 does not quite extend in a plane perpendicular to the container axis but is in the shape of a frustum of a cone and shows an inward inclination A1 when shown in the transversal section of FIG. 1, of a small angle with respect of a plane perpendicular to the container axis X. This provides a spring and absorbing effect under the hydrostatic pressure on the diaphragm 9 in its upwardly inverted position (in dotted lines on FIG. 3), whereby pressure on the diaphragm 9 results in the support flange 12 pivoting and coming into abutment with a planar supporting surface instead of inversion of the diaphragm 9 back to its initial position (in continuous line on FIG. 3).

In the just-blown non-filled configuration of the container 1 as depicted on FIG. 1 and in continuous line on FIG. 3, the invertible diaphragm 9 extends both inwards and downwards, from a outer edge 13 having a sharp apex where the diaphragm 9 connects to an upper end of the inner portion 11 of the high standing ring 8, down to a smoother inner edge 14 where the diaphragm 9 connects to a central upwardly protruding recess 15.

In a preferred embodiment, the radial extension or width, denoted W5, of the diaphragm 9, is comprised between 50% and 80%—and preferably of about 60%—of the outer radius, denoted R3, of the support flange 12 (where R3 is half D3):

$$0.5 \cdot R3 \le W5 \le 0.8 \cdot R3$$

and, preferably:

$$W5 \cong 0.6 \cdot R3$$

In addition, the axial extension, or height, denoted H5, of the diaphragm, is such that the inner edge of the diaphragm extends slightly above a standing plane perpendicular to the container axis X and defined by an outer edge of the high standing ring 8.

In other words, the height H5 of the diaphragm 9 is slightly lower than the height H4 of the high standing ring 8. In a preferred embodiment, the height H5 of the diaphragm 9 is greater than 85%—and preferably of about 90%—of the height H4 of the standing ring 8:

$$H5 \ge 0.85 \cdot H4$$

and, preferably:

$$H5 \cong 0.9 \cdot H4$$

Figure 4:
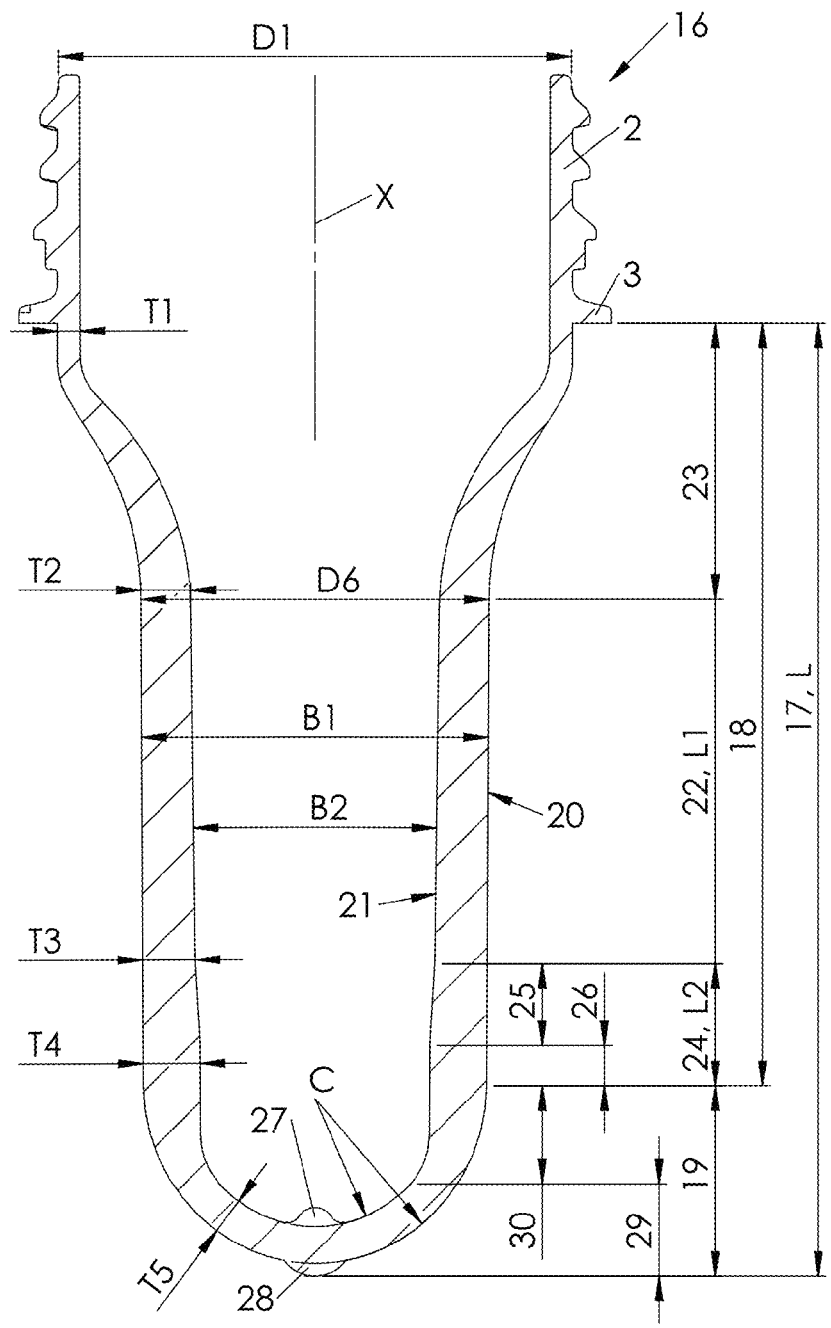
FIG. 4 is a realistic enlarged sectional view showing the preform of FIG. 1.
Figure 5:
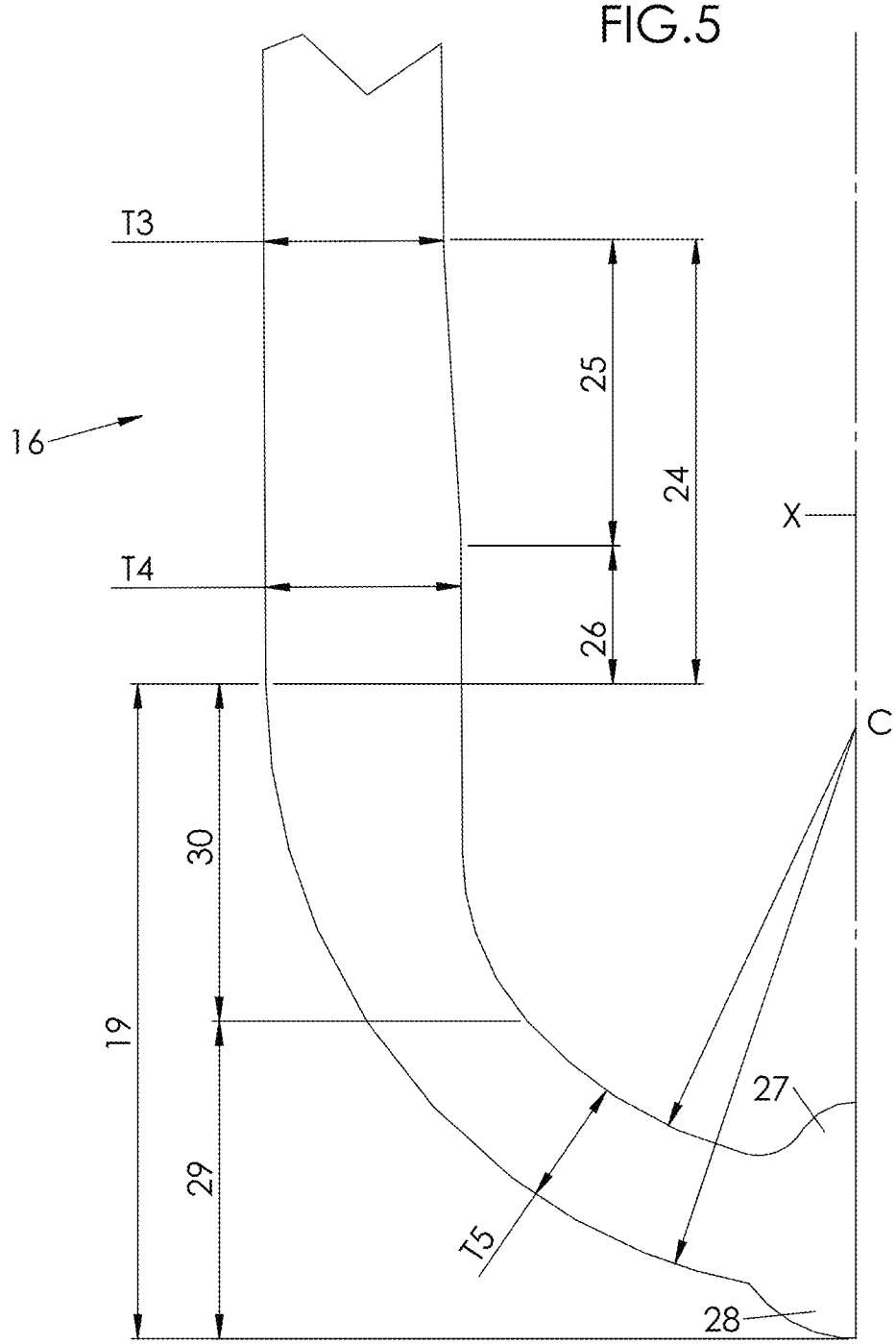
FIG. 5 is a realistic enlarged fragmentary sectional view showing a detail of the preform of FIG. 4, in the vicinity of a bottom of the preform.

On FIG. 4 and FIG. 5, there is shown in more details a preform 16 from which the container 1 disclosed hereinbefore is formed. The preform 16 is made by injection or compression molding from a single plastic material, preferably PET.

The preform 16 comprises the same neck 2 (which is not subjected to variations during the blowing of the container) as the container 1, which also terminates, at the lower end thereof, with the support collar 3.

Below the collar 3, the preform 16 has a body 17 which includes a wall 18 and, at a lower end of the wall 18, a closed bottom 19 which terminates the preform 16 at a lower side opposite the neck 2. The length of the preform body 17 (i.e. below the collar 3), is denoted L.

In its wall 18 and bottom 19, the preform 16 has an outer surface 20 and an inner surface 21.

As depicted on FIG. 4, the wall 18 of the preform 16 is comprised of a main segment 22 of substantially cylindrical shape, an upper end segment 23 which terminates the main segment 22 upwardly and connects to the collar 3, and a lower end segment 24 which terminates the main segment 22 downwardly and connects to the bottom 19.

Figure 7:
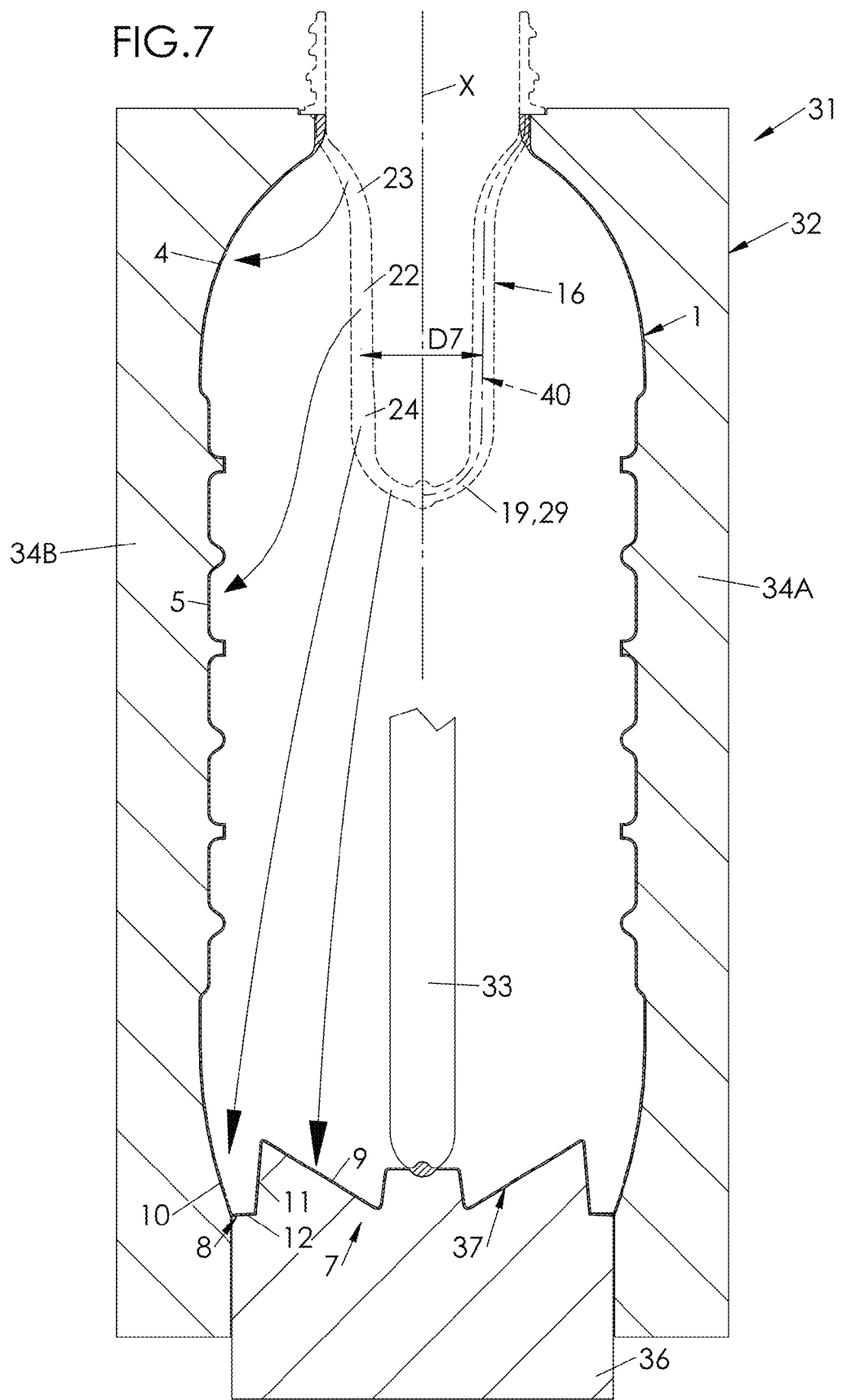
FIG. 7 is a realistic sectional view of the stretch-blow molding unit of FIG. 6, further showing the container formed therein from the preform (also shown in dotted line)

During the blow molding of the container 1, the main segment 22 forms the wall portion 5 of the container 1; the upper end segment 23 forms the shoulder 4 of the container 1; the lower end segment 24 forms the high standing ring 8 of the container 1; and the bottom 19 of the preform 16 forms the invertible diaphragm 9 and central protruding recess 15, as shown by the arrows on FIG. 7.

The overall diameter of the main segment 22, taken at its junction with the upper end segment 23 is denoted D6.

In the depicted embodiment wherein the preform 16 corresponds to a container 1 of small capacity (i.e. less than 1 l, such as 0.5 or 0.6 l), the overall diameter D6 of the main segment 22 is smaller than the diameter D1 of the neck 2. In an alternate embodiment in which the preform corresponds to a container of greater capacity (i.e. more than 1 l, such as 1.5 l or 2 l), this relationship may be reversed.

In a preferred embodiment corresponding to the illustrated example, the upper end segment 23 has the shape of a horn and smoothly connects the main segment 22 at diameter D6 to the collar 3 at diameter D1. As may be seen on FIG. 4, the wall thickness of the preform 16 in the upper end segment 23, as measured perpendicularly to the preform axis X (which is identical to the subsequent container axis X), increases from a value T1 immediately below the collar 3, where it corresponds to the wall thickness of the preform 16 in the neck 2 (excluding the thread), to a value T2 at the junction with the main segment, where T1 is lower than T2, and preferably lower than half T2:

$$T1<T2$$

and preferably:

$$T1 \leq 0.5 \cdot T2$$

In the illustrated preferred embodiment, the main segment 22 is in the shape of a frustum of a cone with a small draft angle B1 on the outer surface 20 and a small draft angle B2 on the inner surface 21, both angles B1 and B2 being lower than 2°, and preferably:

$$B1 \leq B2 \leq 2°$$

In a preferred embodiment, B1 is smaller than 1°, and preferably of about 0.6°. Also in a preferred embodiment, B2 is smaller than 1.5°, and preferably of about 1.3°.

In a preferred embodiment, the length, taken axially and denoted L1, of the main segment 22, is comprised between 60% and 70%—and preferably between 65% and 70%—of the length L of the preform 16:

$$0.6 \cdot L \leq L1 \leq 0.7 \cdot L$$

and preferably:

$$0.65 \cdot L \leq L1 \leq 0.7 \cdot L$$

Although the preform wall thickness may be substantially constant along the main segment 22, in a preferred embodiment, the preform wall thickness, as measured perpendicularly to the preform axis X, slightly (and linearly) increases from the value T2 at the junction of the upper end segment 23 and the main segment 22, to a value T3 at the junction of the main segment 22 and the lower end segment 24:

$$T2<T3$$

The material distribution in the upper end segment 23 and main segment 22 is calculated to provide substantially constant thickness of the container 1 in the shoulder 4 and wall portion 5.

The thickness increase in the upper end segment 23 allows for a sufficient thickness of the material in the container shoulder 4, since the material located immediately below the collar 3 is less stretched (mostly in the radial or hoop direction) than the material located at the junction between the upper end segment 23 and the main segment 22 of the preform 16. Similarly, the thickness increase in the main segment 22 allows for a sufficient thickness of the material in the wall portion 5 of the container 1, since the material located at the junction between the main segment 22 and the upper end segment is less stretched (both in the axial or length direction and in the radial or hoop direction).

In the illustrated preferred embodiment, the lower end segment 24 has an upper section 25 of increasing wall thickness, adjacent the main segment 22, and a lower section 26 of substantially constant wall thickness, adjacent the bottom 19. In the lower section 26, the preform 16 has a wall thickness, denoted T4, the value of which is therefore greater than the value T3 of the wall thickness of the preform 16 at the junction of the main segment 22 and lower end segment 24. In a preferred embodiment, T4 is 5% to 15% greater than T3, and for example of about 10% greater than T3:

$$T4 \geq T3$$

and, preferably:

$$1.05 \cdot T3 \leq T4 \leq 1.15 \cdot T3$$

and, for example:

$$T4 \cong 1.1 \cdot T3$$

The increased wall thickness of the preform 16 in the lower end segment 24 allows for reinforcing the lower end portion 10 and the support flange 12, more specifically in the vicinity of the junction between the lower end portion 10 and the support flange 12, where rigidity is required on the one hand to facilitate the inversion process and, on the other hand, to provide good stability of the container 1 both during mass handling or storing operations, and during individual normal use of the container 1 where it is stored vertically standing on a planar surface such as a table or a refrigerator shelf.

In a preferred embodiment, the length, taken axially and denoted L2, of the lower end segment 24, is comprised between 30% and 40%—and preferably between 30% and 35%—of the length L1 of the main segment 22. In the preferred depicted example, L2 is about 33% of L1:

$$0.3 \cdot L1 \leq L2 \leq 0.4 \cdot L1$$

and preferably:

$$0.6 \cdot L1 \leq L2 \leq 0.35 \cdot L1$$

and, for example:

$$L2 \cong 0.33 \cdot L1.$$

In a preferred embodiment illustrated on FIG. 4, the preform 16 is provided with a rounded upstanding centering index 27 protruding inwardly from the inner surface 21 of the preform 16 in the axis X thereof.

Also in one embodiment illustrated on FIG. 4, wherein the preform 16 is injection molded, the preform 16 is provided with a downwardly projecting central protrusion 28 which corresponds to the counter print of an injection gate formed in the mold in which the preform 16 was injection molded.

In a preferred embodiment, the bottom of the preform 16 has a central region 29 in the form of a spherical dome, the center C of curvature of which is located on the preform axis X.

In the central region 29, the outer surface 20 and the inner surface 21 of the preform 16 are preferably both spherical with common center of curvature C.

In consequence, in the central region 29 (apart from the centering index and protrusion), the preform 16 has a wall thickness, denoted T5, as taken radially from the center C of curvature, which is substantially constant.

In the depicted example, the bottom of the preform 16 is also provided with a peripheral region 30 which is located below the lower end segment 24 and makes junction with the central region 29. The peripheral region 30 is of decreasing wall thickness as taken radially from the center C of curvature of the central region 29, such that the wall thickness T5 of the preform 16 in the central region 29 of the bottom 19 is smaller than the wall thickness T4 of the lower end segment 24.

In a preferred embodiment, the wall thickness T5 of the preform 16 in the central region 29 is comprised between 50% and 80% (and preferably lower than 70%, and for example of about 65%) of the wall thickness T4 of the lower end segment 24:

$$0.5 \cdot T4 \leq T5 \leq 0.8 \cdot T4$$

preferably:

$$0.5 \cdot T4 \leq T5 \leq 0.7 \cdot T4$$

and, for example:

$$T5 \approx 0.65 \cdot T4$$

The decreased wall thickness of the peripheral region 30, and the comparatively smaller (and constant) wall thickness in the central region 29 of the preform bottom 19 allows for a better printing of the invertible diaphragm 9, and a reduced thickness of the material in the invertible diaphragm 9, thereby facilitating inversion thereof, as will be disclosed hereinafter.

Figure 6:
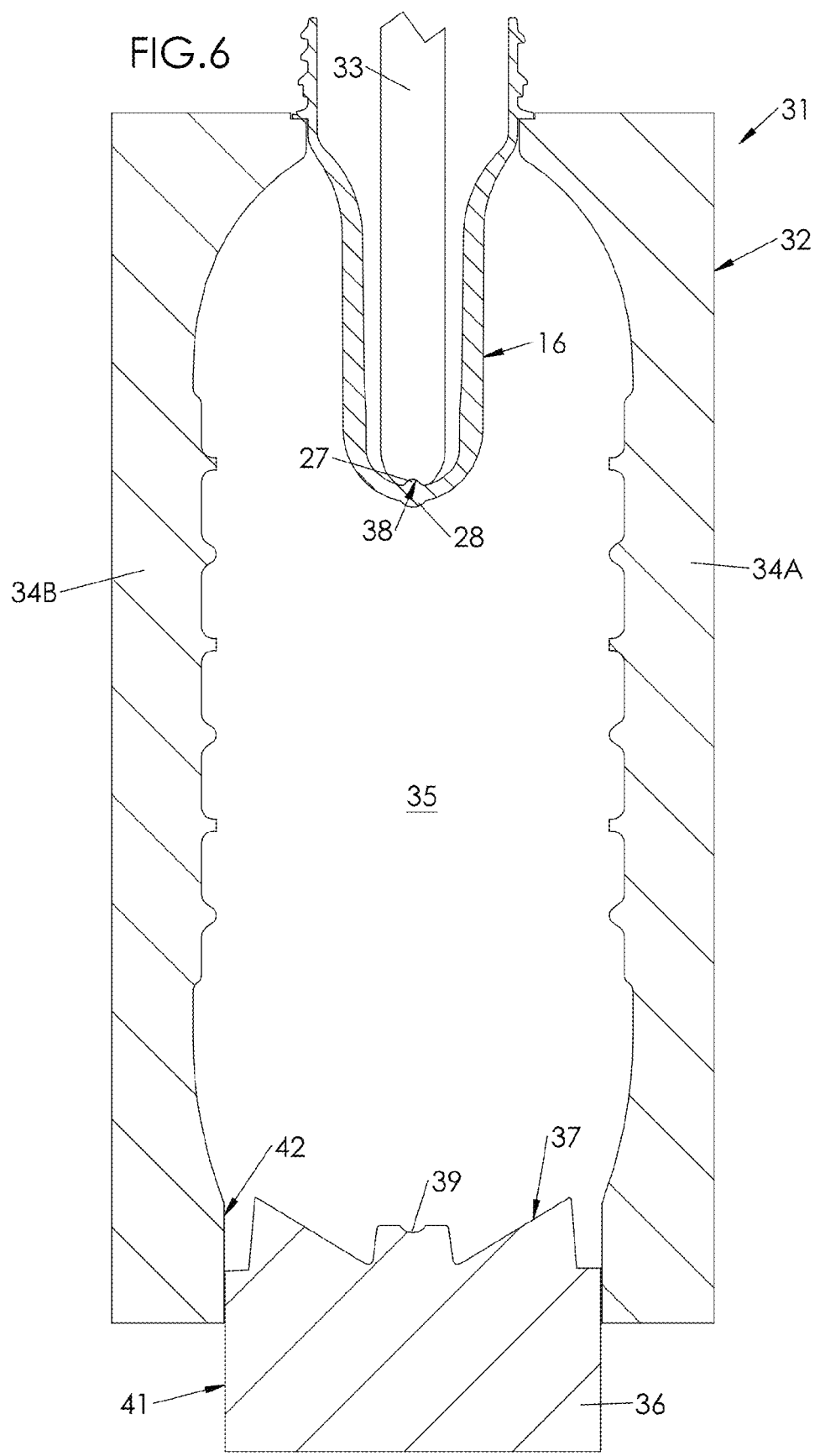
FIG. 6 is a realistic sectional view of a stretch blow molding unit including a mold with a movable base mold for manufacturing a hot-fill container, showing a preform from which the container is to be formed.

The manufacturing of the hot-fill container 1 from the preform 16 is achieved through a blow molding unit 31 including a blow mold 32 and a stretch rod 33, as depicted on FIG. 6 and FIG. 7.

The blow mold 32 has sidewalls 34A, 34B, including heating means, not illustrated (such as holes for the circulation of a heating fluid such as hot water or hot oil, or electric radiators received within the sidewalls 34A, 34B), for heating the sidewalls 34A, 34B at a predetermined temperature much greater than the average environment temperature and which, in a preferred embodiment, is of about 80-180° C.

The sidewalls 34A, 34B together define at least part of a molding cavity 35 for receiving the preform 16 and form a counter print of the wall portion 5, including the lower end portion 10 and shoulder 4 of the container 1.

The blow mold 32 also has a mold base 36, which has an upper surface 37 forming a counter print of the container base 7 including the support flange 12, the inner portion 11, the diaphragm 9 and the central protruding recess 15. The sidewalls 34A, 34B, together with the mold base 36, define the whole molding cavity 35 of the container 1.

The mold base 36 is movable with respect of the sidewalls 34A, 34B between a retracted position (FIG. 6) in which the upper surface 37 extends below the container base 7 to be blow molded, and a raised position (FIG. 7) in which the upper surface 37 closes the cavity 35 and extends at the exact place of the container base 7 to be blow molded.

This provides an over stretching of the material during the blow molding, whereby the material of the preform 16 is first stretched beyond the final position of the container base 7, in the retracted position of the mold base 36, and then the mold base 36 is moved to its raised position in order to push the stretched material up to form the final shape of the container base 7.

Such a process allows for a better printing quality, a better material thickness, and hence a better stiffness from the lower end portion 10 to the inner portion 11.

During the stretch blow molding of the container 1, the centering index 27 is received within a corresponding recess 38 formed axially at a lower end tip of a stretch rod 33. This ensures a proper centering of the preform 16 until it reaches the mold base 36.

By the end of the blow molding of the container 1, the central outward protrusion 28 is received within a central recess 39 formed axially in a mold base 36. This ensures a proper centering of the container base 7 during the pushing up thereof, through the displacement of the mold base 36 from its retracted position to its raised position.

During the blow molding of the container 1, the preform 16 is subjected to a length stretch ratio comprised between 3.4 and 3.9, and a hoop stretch ratio comprised between 3.5 and 3.9.

The length stretch ratio is the ratio between the developed length of an average line 40 between the outer surface 20 and the inner surface 21 of the preform 16 taken along the body 17, i.e. from immediately below the collar 3 to the center of the bottom 19, in an axial sectional plane as depicted on FIG. 1, and the developed length of the container 1 taken from immediately below the collar 3 to the center of the base 7, in a same axial sectional plane as depicted on FIG. 1.

The hoop stretch ratio is the ratio between the average diameter D7 of the main segment 22 (i.e. at about half of the length thereof), taken at the average line 40) and the overall diameter D2 of the wall portion 5 of the container 1.

In a preferred embodiment, the length stretch ratio is comprised between 3.6 and 3.8. Also in a preferred embodiment, the hoop stretch ratio is comprised between 3.7 and 3.8.

Such stretch ratios, combined with the material distribution disclosed hereinbefore, allows for a better printing of the container wall portion 5 and base during the blow molding. More specifically, this facilitates the printing of stiffening ribs 6 on the wall portion 5 of the container 1, which provide rigidity of the wall portion 5 against deformations due to a vacuum inside the container 1 and confine most of the container 1 deformation onto the container base 7.

Figure 8:
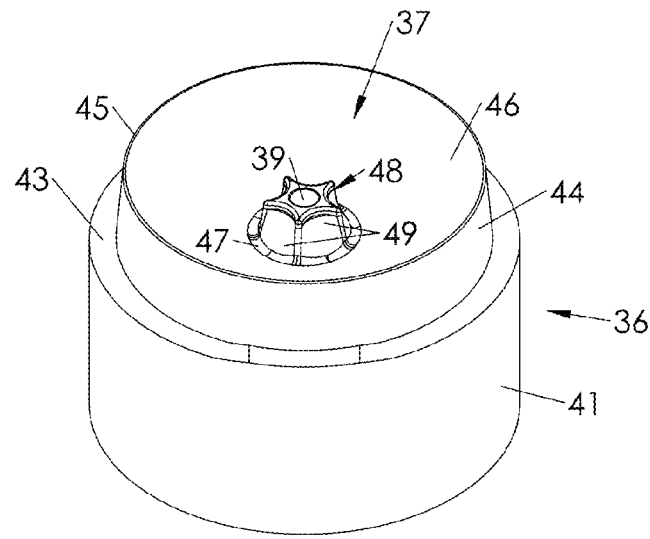
FIG. 8 is a realistic perspective view of a base mold for a molding unit of FIG. 6.
Figure 9:
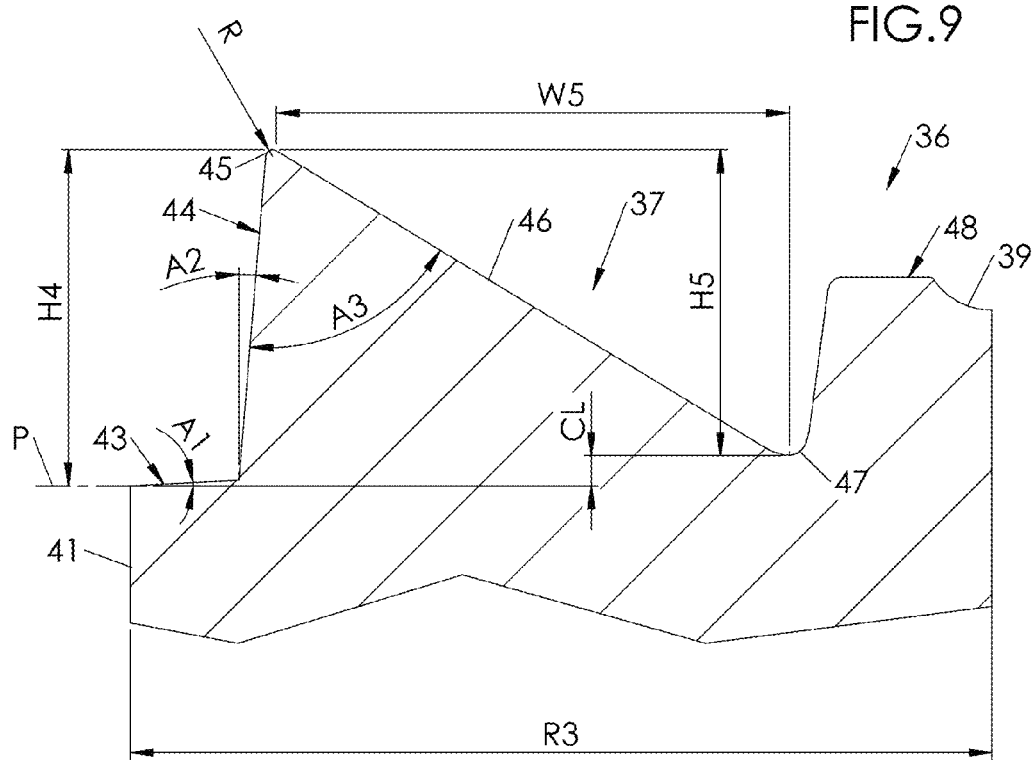
FIG. 9 is a realistic enlarged fragmentary sectional view showing a detail of the base mold of FIG. 8.

The mold base 36 is illustrated in further details on FIG. 8 and FIG. 9. As depicted on FIG. 8, the mold base 36 comprises a cylindrical piston 41 by which the mold base 36 is capable of being axially moved and guided in a corresponding bore 42 in the bottom of the sidewalls 34A, 34B. The piston 41 terminates by the upper surface 37 forming a counter print of the container base 7, including the support flange 12, the inner portion 11 of the high standing ring 8, and also the diaphragm 9 and central protruding recess 15.

The upper surface 37 includes an annular peripheral face 43 corresponding to the annular support flange 12 of the container base 7. This peripheral face 43 does not quite extend in a plane perpendicular to the base mold axis (which is substantially identical to the preform and container axis X) but is in the shape of a frustum of a cone and shows an inward inclination when shown in the transversal section of FIG. 9, of a small angle A1 comprised between 1° and 10°, preferably between 2° and 5°—and for example of about 3°—with respect of a plane perpendicular to the base mold axis.

The upper surface 37 also includes a frusto-conical outer face 44 corresponding to the inner portion 11 of the high standing ring 8. The outer face 44 protrudes upwardly from an inner edge of the annular peripheral face 43, up to a sharp apex 45 corresponding to the outer edge 13 at the junction between the inner portion 11 and the diaphragm 9. The outer face 44 defines a draft angle A2 with respect of a vertical line parallel to the base mold axis comprised between 1° and 10°, preferably between 3° and 6°, and for example of about 4.5°.

The upper surface 37 of the mold base 36 further includes a frusto-conical downwardly inclined inner face 46 corresponding to the invertible diaphragm 9. The inner face 46 extends from the apex 45 down to an annular inner edge 47 where it connects to a central uprising push-up 48 corresponding to the central recess 15 in the container base 7.

The apex 45 is sharp in that it has a radius of curvature, denoted R, of less than or equal to 1.5 mm. In a preferred embodiment, the radius R of curvature of the apex 45 is less than or equal to 0.25 mm. The apex 45 may also have no measurable radius of curvature, i.e. the radius of curvature is less than or equal to 0.1 mm. This provides a sharp junction between the inner portion 11 and the diaphragm 9 in the container base 7, allowing for both a better inward inversion of the diaphragm 9 wherein the sharp apex of the outer edge 13 at the junction between the inner portion 11 and the diaphragm 9 forms a punctual (when view in axial section) hinge therebetween, and a better rigidity of the container base 7 after inversion. Part of the mold base 36 may be lathe worked, in particular to obtain the sharp apex 45.

The outer face 44 and inner face 46 together define at the apex 45 an angle A3, when shown in an axial sectional plane such as on FIG. 9, comprised between 50° and 70°, and preferably comprised between 60° and 65°. In a preferred embodiment, angle A3 is of about 63°.

Combination of the draft angle A2, sharp apex 45 and angle A3 provide good combined molding capability and performance to the container base 7. In particular, as already stated, upward inversion of the diaphragm 9 is facilitated whereas outward (or back) inversion thereof is prevented, whereby the diaphragm 9 is locked in its inverted position. Also, the extraction volume EV (i.e. the volume of liquid displaced during the diaphragm inversion, shown by the hatch lines on FIG. 3), is maximized with respect of the whole volume of liquid in the container 1 after filling.

The extraction volume EV is also maximized due to the inner edge 47 located close to a peripheral plane P (corresponding to the standing plane of the container 1) defined by the outer edge of the peripheral face 43, whereby the inner edge 47 is spaced from the peripheral plane with a clearance CL comprised between 1 mm and 5 mm, and preferably of about 2 mm. Such clearance CL allows for a small downward piston movement of the central recess 15 of the container base 7 after filling, due to hydrostatic pressure, without affecting stability of the container 1 standing on its support flange 12.

In a preferred embodiment depicted on FIG. 8, the push-up 48 is star-shaped is transversal section and comprises a series of recesses 49 (five in the depicted example) which, by counter printing during the blow molding of the container 1, form convex reinforcing ribs 50 in the central recess 15 of the container base 7, thereby stiffening the central recess 15 and preventing inversion thereof under the combined effects of hydrostatic pressure and temperature of the content.

Inversion of the diaphragm 9 is preferably achieved mechanically by means of a mandrel which has a top apex capable of being received into the central recess 15 and which, after filling, capping and cooling down of the container 1, is moved upwards whereas the container 1 is held tight. Under pressure of the mandrel, the diaphragm 9 deforms and articulates around the sharp junction with the inner portion 11 which is slightly bent outwards, until the diaphragm 9 upwardly inverts towards its final position depicted in dotted line on FIG. 3. The inner portion 11 of the high standing ring 8 then bends back to its initial position where it forms an arch capable of standing buckling and bending constraints applied by the diaphragm 9 under hydrostatic pressure of the content.

The invention claimed is:

1. A mold (32) for blow molding a container (1) from a preform (16), said container (1) comprising a wall portion (5) and a base (7) including a high standing ring (8) and a central outwardly-inclined invertible diaphragm (9), said mold (32) comprising sidewalls (34A, 34B) forming a counter print of the wall portion (5) of the container (1) and a mold base (36) having an upper surface (37) defining a counter print of the container base (7), wherein the upper surface (37) includes:
 an annular peripheral face (43) corresponding to an annular support flange (12) of the container base (7),
 a frusto-conical outer face (44) corresponding to an inner portion (11) of the high standing ring (8), said outer face (44) protruding upwardly with a draft angle (A2) from an inner edge of the peripheral annular face (43) up to a sharp apex (45),
 a frusto-conical downwardly inclined inner face (46) corresponding to the invertible diaphragm (9),
and wherein:
 the annular peripheral face (43) is in the shape of a frustum of a cone and shows an inward inclination in a transversal section,
 the peripheral face (43) defines, with respect of a plane (P) perpendicular to a mold base axis, an angle (A1) comprised between 1° and 10°, and
 the outer face (44) and the inner face (46) of the upper surface (37) together define at the apex (45) an angle (A3) comprised between 50° and 70°.

2. A mold (32) according to claim 1, wherein said angle (A1) is of about 3°.

3. A mold (32) according to claim 1, wherein the draft angle (A2) is comprised between 1° and 10°.

4. A mold (32) according to claim 3, wherein the draft angle (A2) is of about 4.5°.

5. A mold (32) according to claim 1, wherein the angle (A3) at the apex (45) is comprised between 60° and 65°.

6. A mold (32) according to claim 5, wherein the angle (A3) at the apex (45) is of about 63°.

7. A mold (32) according to claim 1, wherein the apex (45) has a radius (R) of curvature of less than or equal to 1.5 mm.

8. A mold (32) according to claim 1, wherein the inner face (46) of the upper surface (37) extends from the apex (45) down to an annular inner edge (47) where the inner face (46) connects to a central uprising push-up (48) corresponding to a central recess (15) in the container base (7).

9. A mold (32) according to claim 8, wherein the inner edge (47) of the inner face (46) defines with a peripheral plane (P) defined by an outer edge of the peripheral face a clearance (CL) comprised between 1 mm and 5 mm.

10. A mold (32) according to claim 9, wherein the clearance (CL) is of about 2 mm.

11. A mold (32) according to claim 1, wherein the mold base (36) is movable with respect of the sidewall (34), between a retracted position in which the upper surface (37) extends below the container base (7) to be formed, and a raised position in which the upper surface (37) closes the cavity (35).

12. A mold (32) according to claim 2, wherein the draft angle (A2) is comprised between 1° and 10°.

\* \* \* \* \*